(12) United States Patent
Maxwell et al.

(10) Patent No.: US 12,423,720 B1
(45) Date of Patent: Sep. 23, 2025

(54) HIGH-DEMAND PRODUCT PROCESSING SYSTEM AND RELATED METHODS

(71) Applicant: INMAR SUPPLY CHAIN SOLUTIONS, LLC, Winston-Salem, NC (US)

(72) Inventors: Seth Maxwell, Lewisville, NC (US); Nirajan Kharal, Las Cruces, NM (US); Mark Lingelbach, Winston-Salem, NC (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 347 days.

(21) Appl. No.: 17/726,938

(22) Filed: Apr. 22, 2022

(51) Int. Cl.
*G06Q 30/02* (2023.01)
*G06F 16/951* (2019.01)
*G06Q 30/0201* (2023.01)
*G06Q 30/0202* (2023.01)
*G06Q 30/0207* (2023.01)
*G06Q 20/20* (2012.01)

(52) U.S. Cl.
CPC ....... *G06Q 30/0202* (2013.01); *G06F 16/951* (2019.01); *G06Q 30/0201* (2013.01); *G06Q 30/0206* (2013.01); *G06Q 30/0222* (2013.01); *G06Q 20/202* (2013.01)

(58) Field of Classification Search
CPC .......................................... G03Q 10/00–90/00
See application file for complete search history.

(56) References Cited

U.S. PATENT DOCUMENTS

| | | | |
|---|---|---|---|
| 8,010,404 B1 * | 8/2011 | Wu ..................... | G06Q 30/0242 705/7.29 |
| 10,083,411 B2 | 9/2018 | Kinsey, II et al. | |
| 2010/0306031 A1 * | 12/2010 | McCauley ............. | G06Q 30/02 705/7.29 |
| 2013/0246228 A1 * | 9/2013 | Xing ..................... | G06Q 10/08 705/28 |
| 2016/0171571 A1 * | 6/2016 | Umeda ............... | G06Q 30/0605 705/26.2 |
| 2017/0109767 A1 * | 4/2017 | Shpanya ............ | G06Q 30/0283 |

OTHER PUBLICATIONS

Jerez et al., U.S. Appl. No. 17/592,041, filed Feb. 3, 2022.

* cited by examiner

*Primary Examiner* — Arif Ullah
(74) *Attorney, Agent, or Firm* — ALLEN, DYER, DOPPELT, + GILCHRIST, P.A.

(57) ABSTRACT

A high-demand product processing system may include a seller device associated with a prospective seller, and a high-demand product marketplace server to store historical product data for a given product. The historical product data may include historical product prices and quantities at different times. The server may operate a web crawler to crawl e-commerce websites for current product data for the given product. The current product data may include current product prices and quantities at each of the e-commerce websites. The server may operate a machine learning algorithm to predict whether the given product will be a high-demand product based upon the historical product data and the current product data, and when so, generate an offer-to-purchase the high-demand product, communicate the offer-to-purchase to the seller device, and operate a marketplace to sell the high-demand product at a sales price higher than an offer price associated with the offer-to-purchase.

19 Claims, 7 Drawing Sheets

HIGH-DEMAND PRODUCT PROCESSING SYSTEM AND RELATED METHODS

TECHNICAL FIELD

The present invention relates to the field of electronics, and more particularly, to product demand prediction systems and related methods.

BACKGROUND

A given product may sell at a given rate, for example, determined based upon market research. A manufacturer, for example, may produce a given number of products for a given time period, while a given retailer may purchase or stock a given number of the product based upon demand at that retailer or store. Typically, the production and purchase for sale by a retailer are timed to meet demand.

Oftentimes, a given product may be sold out or unavailable at a given retailer, for example, because the consumer demand exceeds the supply, either purchased by the retailer or produced by the manufacturer. In these cases, whatever supply that may exist may have an increased sales price.

An online or electronic marketplace is a type of electronic commerce website where product or service information is provided by one or more third parties. In an electronic marketplace, transactions are typically processed by the marketplace operator and then delivered and fulfilled by the participating retailers or wholesalers. The electronic marketplace operator typically charges a fee for processing these transactions.

U.S. Pat. No. 10,083,411 to Kinsey II et al. discloses a system for the sale of consumer services. Predictions are made based on the behaviors, preferences, assets, identifying characteristics, and other attributes associated with customers and merchants. In one implementation, a prediction is made as to whether a customer is likely to request a service and whether a merchant is likely to be selected by the customer to provide the service. In another implementation, the calendars of a merchant and customer are automatically updated to account for the customer's late arrival to an appointment at the merchant's location. In yet another implementation, a customer purchases an appointment for a service from another customer that has the appointment scheduled with a merchant providing the service.

SUMMARY

A high-demand product processing system may include a seller device associated with a prospective seller. The high-demand product processing system may also include a high-demand product marketplace server configured to store historical product data for a given product. The historical product data may include historical product prices and historical product quantities at different historical times. The high-demand marketplace server may also be configured to operate a web crawler to crawl a plurality of e-commerce websites for current product data for the given product. The current product data may include current product prices and current product quantities at each of the plurality of e-commerce websites. The high-demand marketplace server may further be configured to operate a machine learning algorithm to predict whether the given product will be a high-demand product based upon the historical product data and the current product data. The high-demand marketplace server may be configured to, when the given product is predicted to be a high-demand product, generate an offer-to-purchase the high-demand product, communicate the offer-to-purchase to the seller device, and operate a marketplace to sell the high-demand product at a sales price higher than an offer price associated with the offer-to-purchase.

The high-demand product marketplace server may be configured to generate a digital promotion associated with the high-demand product. The historical product data may include historical product data from a plurality of point-of-sale (POS) terminals at a plurality of retailers, for example.

The high-demand product marketplace server may be configured to update the machine learning algorithm upon successive iterations of operation of the web crawler. The high-demand product marketplace server may be configured to obtain a purchase price of the high-demand product made by the prospective seller, and generate the offer-to-purchase to be higher than the purchase price, for example.

The high-demand product marketplace server may be configured to determine the prospective seller based upon a product purchase history associated with the prospective seller, for example. The high-demand product marketplace server may be configured to predict whether the given product will be a high-demand product based upon changes in pricing.

The high-demand product marketplace server may be configured to predict whether the given product will be a high-demand product based upon time of year. The high-demand product marketplace server may be configured to predict whether the given product will be a high-demand product based upon a threshold number of the high-demand products being sold in a given time period, for example.

The high-demand product marketplace server may be configured to predict whether the given product will be a high-demand product based upon the current product prices rising above a threshold price. The high-demand product marketplace server may be configured to predict whether the given product will be a high-demand product based upon the current product quantities falling below a threshold quantity.

A method aspect is directed to a method of processing a high-demand product. The method may include using a high-demand product marketplace server to store historical product data for a given product, wherein the historical product data may include historical product prices and historical product quantities at different historical times. The method may also include using the high-demand product marketplace server to operate a web crawler to crawl a plurality of e-commerce websites for current product data for the given product, wherein the current product data may include current product prices and current product quantities at each of the plurality of e-commerce websites. The method may further include using the high-demand product marketplace server to operate a machine learning algorithm to predict whether the given product will be a high-demand product based upon the historical product data and the current product data. The method may further include using the high-demand product marketplace server to, when the given product is predicted to be in high-demand, generate an offer-to-purchase the high-demand product, communicate the offer-to-purchase to a seller device associated with a prospective seller and operate a marketplace to sell the high-demand product at a sales price higher than an offer price associated with the offer-to-purchase.

A computer readable medium aspect is directed to a non-transitory computer readable medium for processing a high-demand product. The non-transitory computer readable medium includes computer executable instructions that when executed by a processor cause the processor to perform operations. The operations may include storing historical product data for a given product. The historical product data may include historical product prices and historical product quantities at different historical times. The operations may also include operating a web crawler to crawl a plurality of e-commerce websites for current product data for the given product. The current product data may include current product prices and current product quantities at each of the plurality of e-commerce websites. The operations may further include operating a machine learning algorithm to predict whether the given product will be a high-demand product based upon the historical product data and the current product data, and when so generating an offer-to-purchase the high-demand product, communicating the offer-to-purchase to the seller device, and operating a marketplace to sell the high-demand product at a sales price higher than an offer price associated with the offer-to-purchase.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
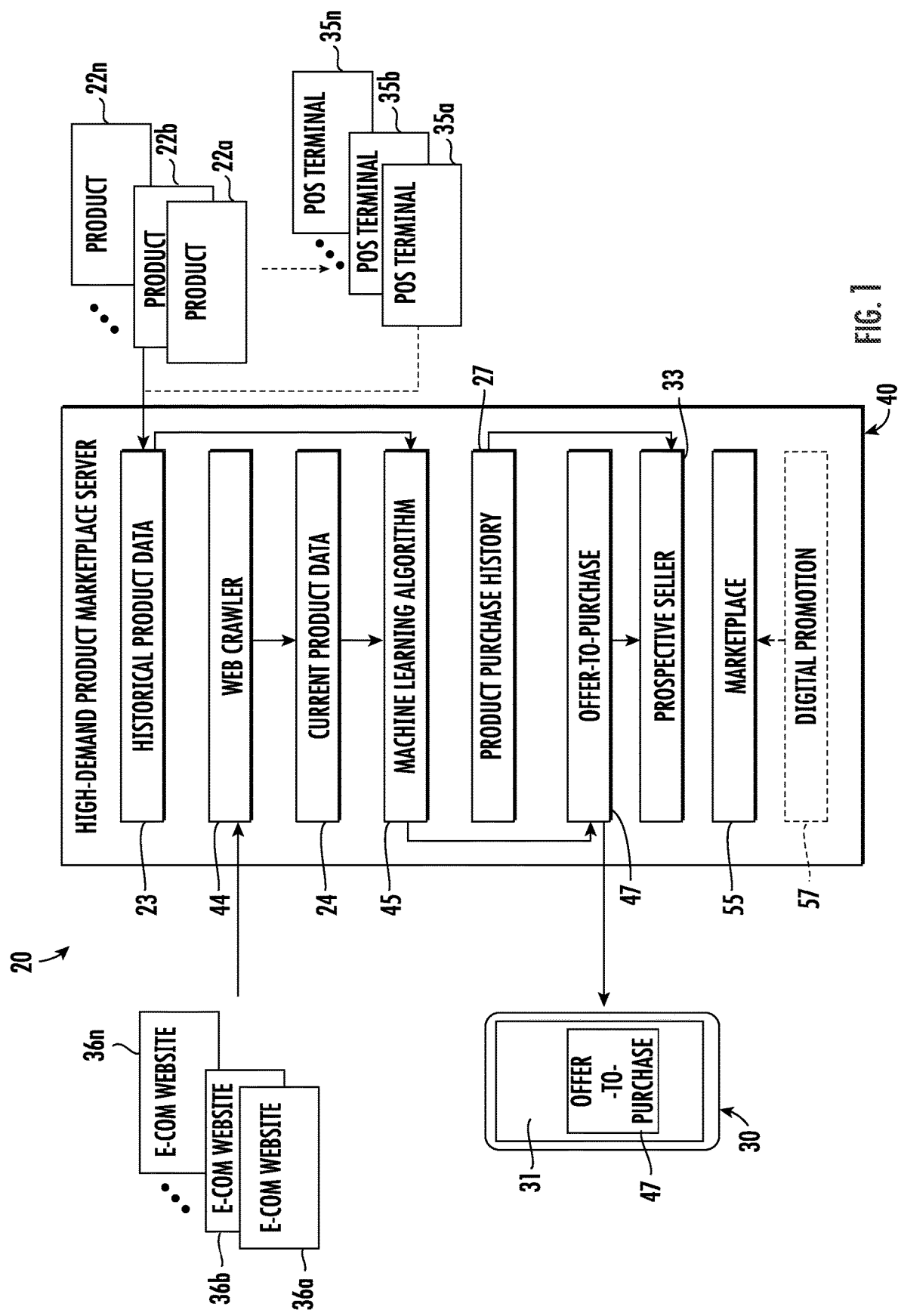
FIG. 1 is a schematic diagram of a high-demand product processing system in accordance with an embodiment.
Figure 2:
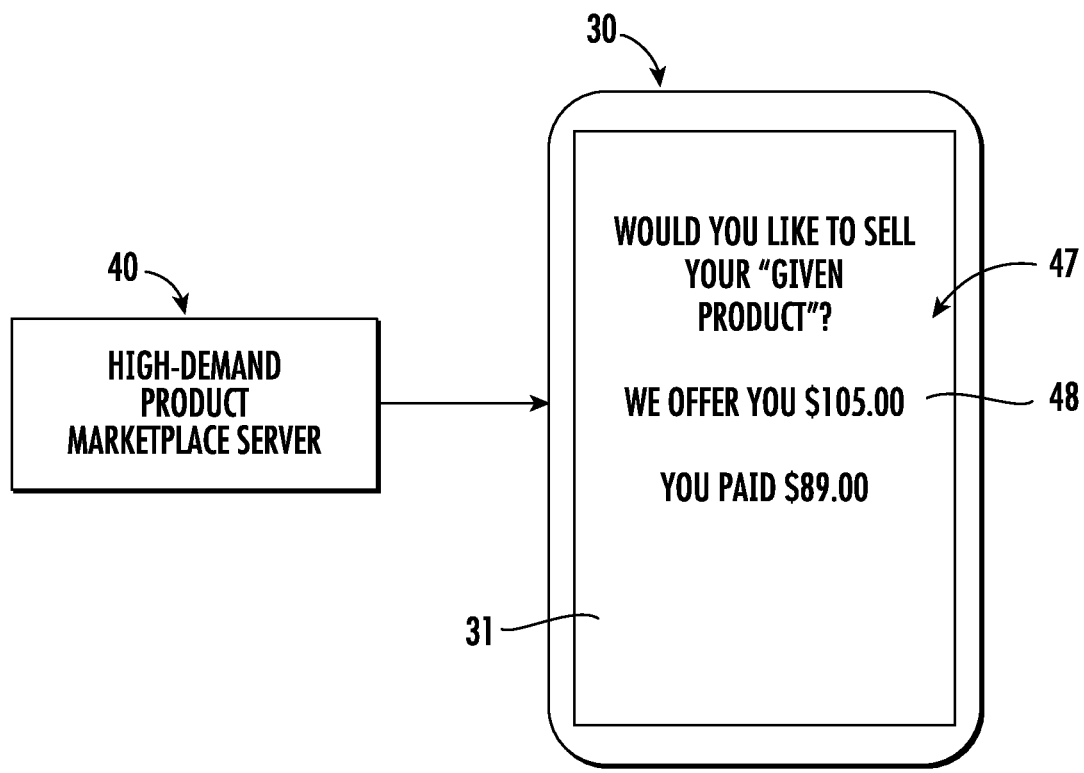
FIG. 2 is a diagram illustrating an offer-to-purchase in accordance with an embodiment.
Figure 3:
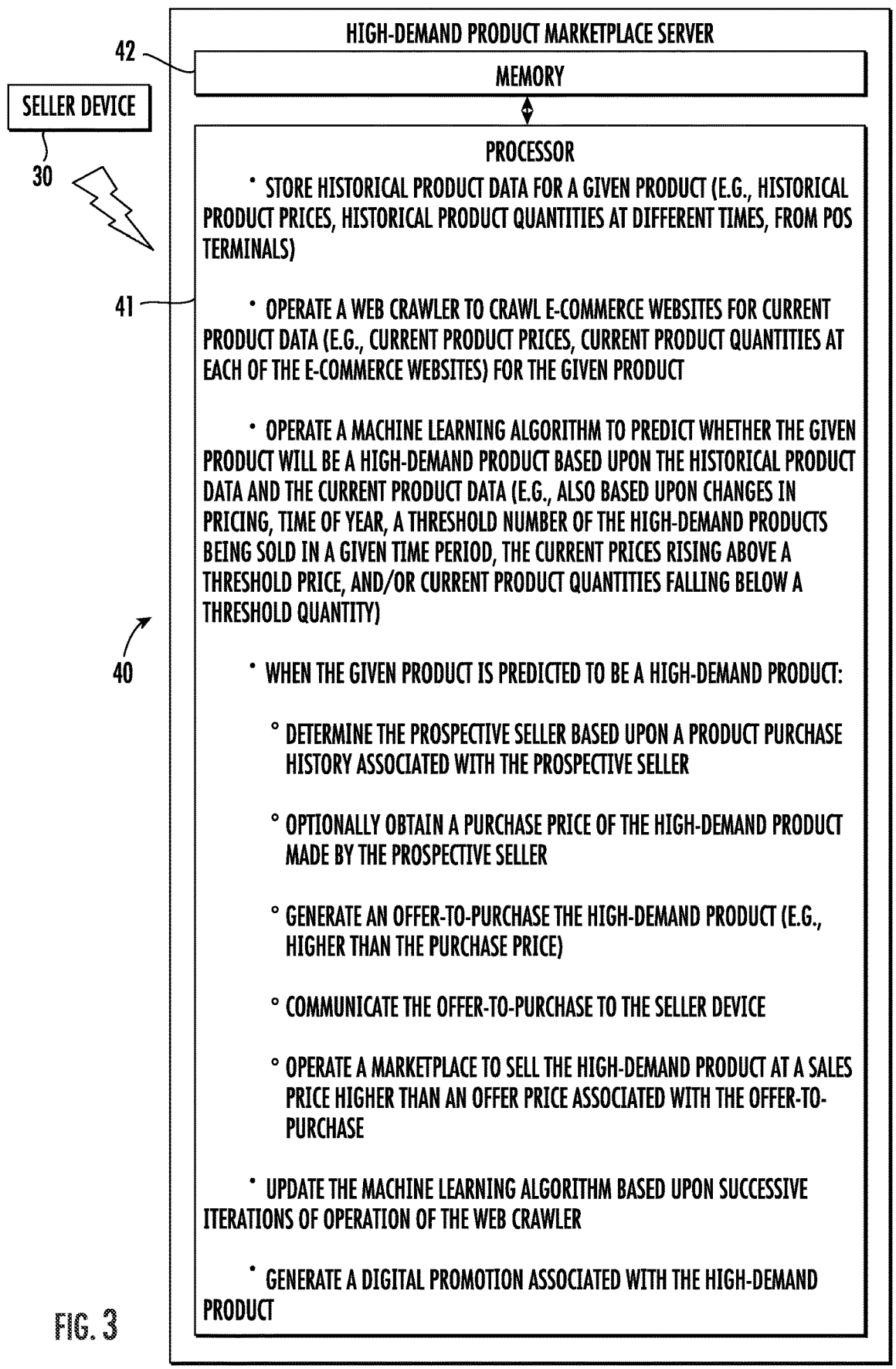
FIG. 3 is a schematic block diagram of the high-demand product processing system of FIG. 1.

Referring initially to FIGS. 1-3, a high-demand product processing system 20 includes a seller device 30. The seller device 30 is associated with a prospective seller 33 of a product. The seller device 30 is illustratively in the form of a mobile wireless communications device, for example, a mobile or smart phone. The seller device 30 may be in the form of another device, for example, a personal computer, a tablet computer, or wearable device.

The high-demand product processing system 20 also includes a high-demand product marketplace server 40. The high-demand product marketplace server 40 includes a processor 41 and an associated memory 42. While operations of the high-demand product marketplace server 40 are described herein, it should be understood that that operations are performed by way of cooperation of the processor 41 and the memory 42.

Figure 4A:
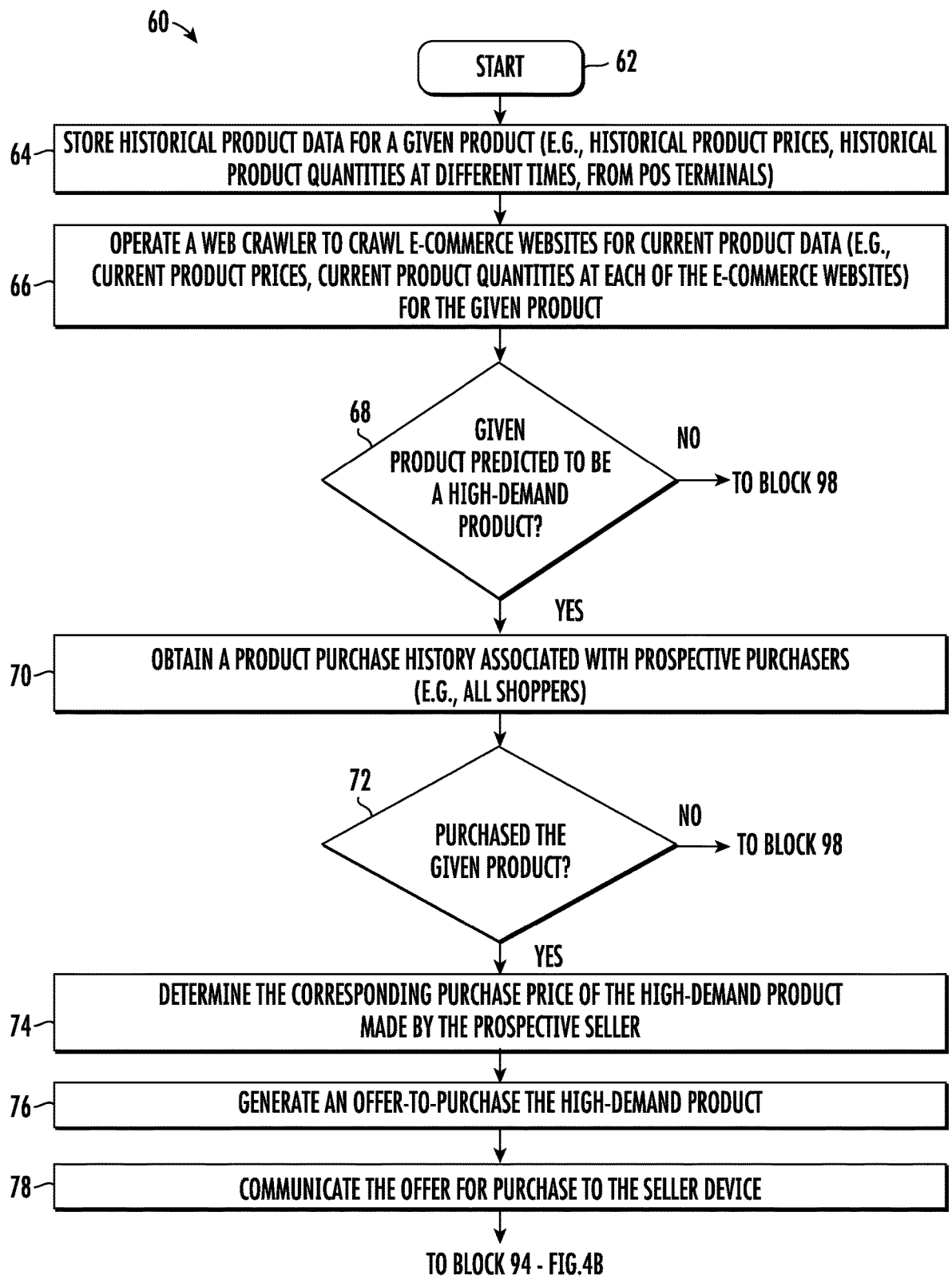
FIGS. 4A and 4B are flowcharts illustrating operation of the high-demand product marketplace server of FIG. 1.
Figure 4B:
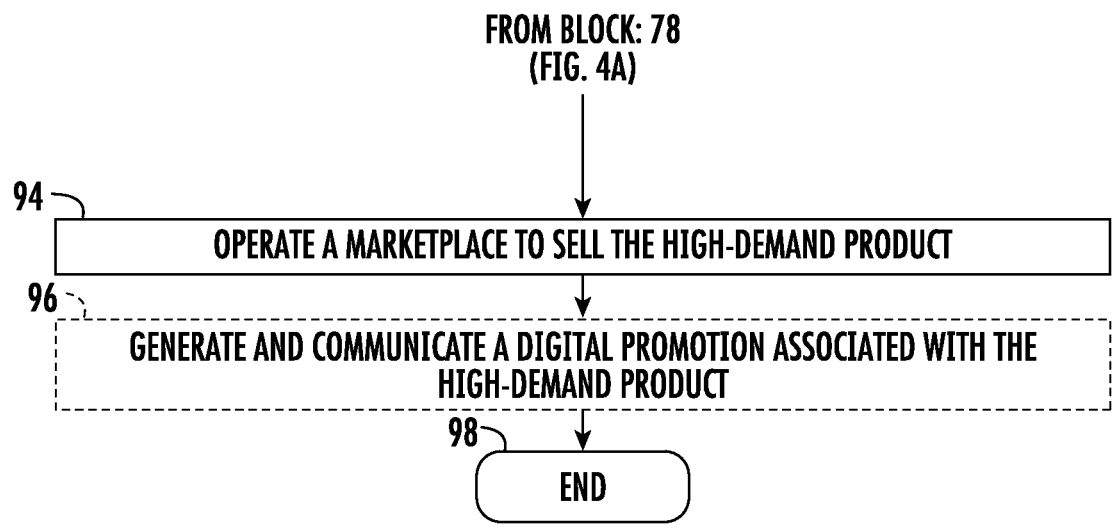

Referring now additionally to the flowchart 60 in FIGS. 4A-4B, beginning at Block 62, operations of the high-demand product marketplace server 40 are now described. At Block 64, the high-demand product marketplace server 40 stores historical product data 23 for each of a plurality of products 22a-22n including a given product 22a. The products 22a-22n may be stored or indexed based upon a corresponding unique product identifier, for example, a uniform product code (UPC) or stock keeping unit (SKU). For each of the products 22a-22n, the historical product data 23 may include, historical product prices and historical product quantities at different historical times. For example, for the given product 22a, the high-demand product marketplace server 40 may store in the memory 42 dates and times with associated prices, quantities on hand at each time at one or more retailers, and geographic locations of the retailers. Other and/or additional information for each product 22a-22n may be stored.

The historical product data 23 may be obtained based upon products being purchased at one or more retailers based upon corresponding point-of-sale (POS) terminals 35a-35n. In other words, as products are being scanned or purchased at POS terminals 35a-35n at different retailers, the product information, such as, product identifiers, are communicated to the high-demand product marketplace server 40 whereby the historical product data 23 is updated.

At Block 66, the high-demand product marketplace server 40 operates a web crawler 44 to crawl e-commerce websites 36a-36n (e.g., scraping) for current product data 24 for the given product 22a. The current product data 24, similar to the historical product data 23, may include current product prices and current product quantities at each of the e-commerce websites 36a-36n. As will be appreciated by those skilled in the art, a web crawler 44 is a bot that systematically browses the Internet to collect and index data.

The high-demand product marketplace server 40, at Block 68, operates a machine learning algorithm 45 to predict whether the given product 22a will be a high-demand product. If the given product 22a is not predicted to be a high-demand product, the operations with respect to the given product end (Block 98), and/or the high-demand product marketplace server 40 may predict whether another or next given product (e.g., product 22b) is a high-demand product. The machine learning algorithm 45 accepts as input the historical product data 23 and the current product data 24. As historical product data 23 and current product data 24 are collected, for example, on an on-going basis and/or through successive iterations of operation of the web crawler 44, the machine learning algorithm 45 is updated.

The high-demand product marketplace server 40 may operate the machine learning algorithm 45 based upon multiple inputs or factors that contribute to whether a given product is determined or predicted to be a high-demand product. For example, the high-demand product marketplace server 40 may predict whether the given product is a high-demand product based upon changes in pricing (e.g., prices trending upward or downward and at what rate), and/or the time of year (e.g., summer for certain summer products, such as, sunscreen, holiday season, such as products being listed on or in toy catalogs, chocolates near Valentine's Day, etc.). The high-demand product marketplace server 40 may alternatively or additionally predict whether the given product 22a is a high-demand product based upon current prices rising above a threshold price (e.g., a fixed price, relative to manufacturer's suggested retail price, an average price over a given time period and/or a given season), and/or current quantities falling below a threshold quantity (e.g., a fixed quantity per store, aggregated among stores, per-store, below an average over a given time period and/or for a given season). Of course, the high-demand product marketplace server 40 may predict whether the given product 22a is a high-demand product based upon other and/or additional factors, for example, that may input to the machine learning algorithm 45.

As will be appreciated by those skilled in the art, the machine learning algorithm 45 may be operate based upon models including artificial neural networks, decision trees, support vector machines, regression analysis, Bayesian networks, and genetic algorithms, for example.

When, at Block 68, the high-demand product marketplace server 40 predicts that the given product 22a will be a high-demand product, the high-demand product marketplace server 40 generates an offer-to-purchase 47 the high-demand product (Block 76). More particularly, in response to the given product 22a being determined to be a high-demand product, the high-demand product marketplace server 40 obtains a product purchase history 27 associated with potential or prospective sellers (Block 70). The product purchase history 27 may include, for a given user identifier (e.g., a loyalty identifier, username, name) product identifiers, quantities, times and dates of purchases, purchase prices, and locations, for example. The product purchase history 27 may be obtained from purchases made via an e-commerce website and/or via POS terminals, similarly to the historical product data 23. The prospective seller 33 is identified based upon or from the product purchase history 27. From the product purchase history 27, the high-demand product marketplace server 40 determines whether the prospective seller 33 has purchased the given product determined to be a high-demand product 22a (Block 72), and also determines the corresponding purchase price of the high-demand product made by the prospective seller (Block 74). In other words, for each customers or user, a determination is made as to whether they are a prospective seller 33. If the given product predicted to be a high-demand product has not been purchased by the prospective seller 33, operations end at Block 98, or alternatively, the high-demand product marketplace server 40 may move on to the next or another prospective seller, as will be appreciated by those skilled in the art.

At Block 76, high-demand product marketplace server 40 generates the offer-to-purchase 47 the high-demand product 22a, including an offer-to-purchase price 48. In some embodiments, the offer-to-purchase price 48 may be at a higher price than purchase price paid 49 by the prospective seller 33 (FIG. 2).

The high-demand product marketplace server 40 communicates the offer-to-purchase 47 to the seller device 30 (Block 78). For example, the high-demand product marketplace server 40 may cooperate with the seller device 30 so that the offer-to-purchase 47 is displayed (e.g., in a form of a notification) on the display 31 of the seller device 30. The offer-to-purchase 47 may be presented in the form of a hyperlink via email or short-messaging-service (SMS) that opens a website or application providing the information, such as, the product that is determined to be high-demand and the offer price 48 to purchase from the prospective seller 33. The offer-to-purchase 47 may be presented in an application, an application notification, or application badge, as will be appreciated by those skilled in the art.

Figure 6:
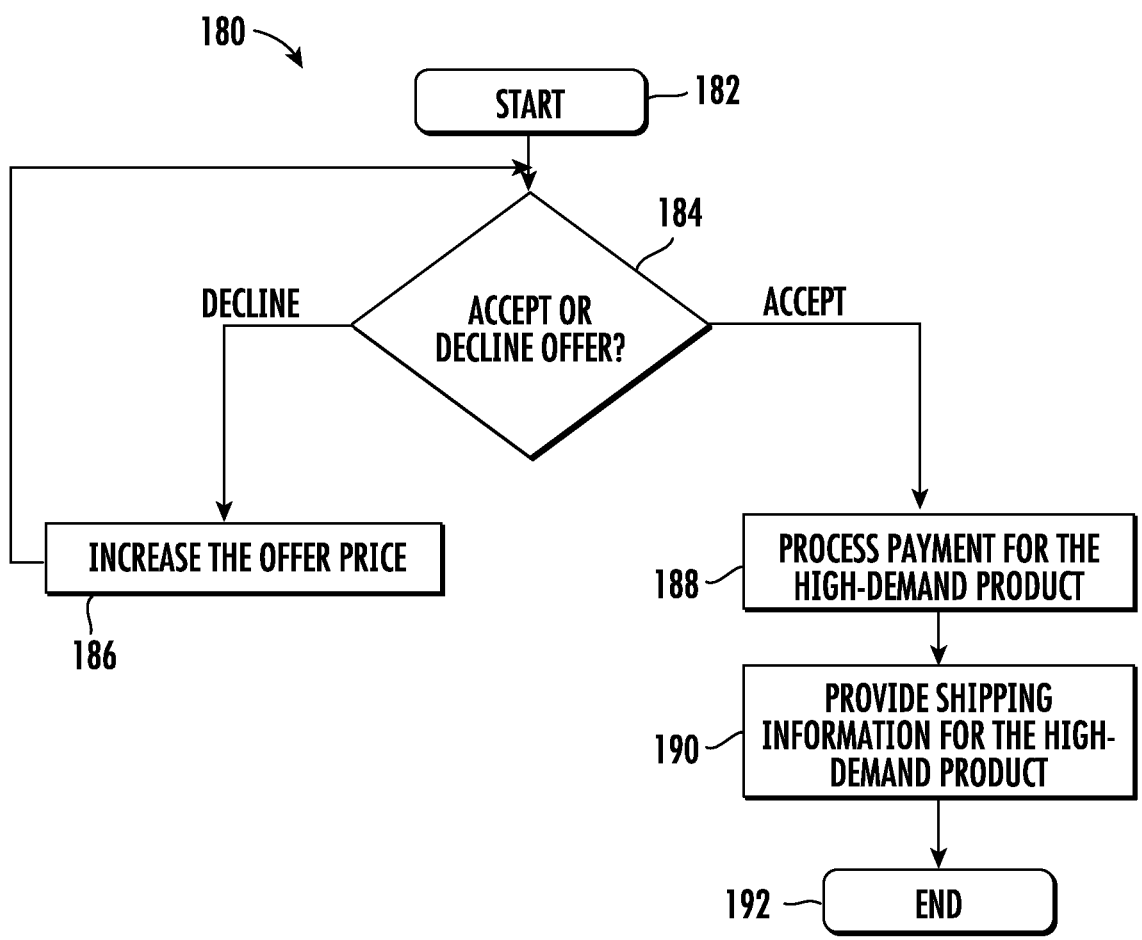
FIG. 6 is another flowchart illustrating operations of the high-demand product marketplace server of FIG. 1.

Referring briefly to the flowchart 180 in FIG. 6, beginning at Block 182 in an embodiment, the prospective seller 33 may accept or decline the offer-to-purchase 47 the high-demand product 22a (Block 184). If the prospective seller 33 declines the offer-to-purchase 47, the high-demand product marketplace server 40 may increase the offer price 48 up to a limit or threshold price (Block 186), for example, as may be determined by a machine learning algorithm that may learn and predict a resale price of the high-demand product 22a. If the prospective seller 33 accepts the offer-to-purchase 47 (Block 184), the high-demand product marketplace server 40 may process payment to the prospective seller (Block 188), for example, upon receipt of the high-demand product 22a from the prospective seller 33 based upon product condition information provided to the high-demand product marketplace server, for example, and provided as input to a price setting machine learning algorithm. The high-demand product marketplace server 40 may provide information to the prospective seller 33 for shipping the high-demand product 22a (Block 190) before ending at Block 192.

Figure 5:
FIG. 5 is a diagram of an exemplary marketplace operated by the high-demand product marketplace server of FIG. 1.

Returning again to the flowchart 60, in FIG. 4B and additionally to FIG. 5, at Block 94, the high-demand product marketplace server 40 operates a marketplace 55 to sell the high-demand product 22a. The marketplace 55 is in the form of an electronic marketplace whereby the high-demand product marketplace server 40 permits listing of the high-demand product 22a in a virtual or online store at a sales price 56 such that other users, for example, by way of respective devices may browse one or more high-demand products. The high-demand product marketplace server 40 sets the sales price 56 to be higher than the offer price 48 associated with the offer-to-purchase 47. The high-demand product marketplace server 40 may operate or update the price-setting machine learning algorithm to determine the sales price, for example, which may be based upon the actual and/or seller provided condition of the high-demand product. The high-demand product marketplace server 40 may change or update the sales price 56 with demand both from the stored historical product data 23, the current product data 24, and traffic on the marketplace 55 (e.g., searches, hits, purchase, purchase prices, etc.).

The high-demand product marketplace server 40 through the marketplace 55 may process payments from a prospective buyer of the high-demand product 22a. Further details of determining product conditions and setting a sale price 56 or resale price are described in U.S. patent application Ser. No. 17/592,041 the entire contents of which are hereby incorporated by reference.

As will be appreciated by those skilled in the art, while the operations are described with respect to the prospective seller 33, those operations may be performed for each of the prospective sellers. Moreover, the high-demand product marketplace server 40 may perform the above operations for each high-demand product (e.g., a same type or item high-demand product purchased by multiple prospective sellers).

The high-demand product marketplace server 40, at Block 96, generates a digital promotion 57 associated to the high-demand product 22a. The digital promotion 57 may have a redeemable value that is redeemable toward the purchase of the high-demand product 22a, for example, on the marketplace 55. The high-demand product marketplace server 40 may communicate the digital promotion 57 to a prospective buyer, for example, by way of communication with the marketplace 55 and based upon login credentials and communications preferences. In embodiments where the marketplace 55 is operated in conjunction with an application on a user device, for example, associated with a prospective buyer, the digital promotion 57 may be communicated via the application and stored in a digital wallet associated with the application and the marketplace 55. In some embodiments, the digital promotion 57 may be for another product 22a-22n, for example, a non-high-demand product and/or a same category or type of product, such as, for example, in the case of a toy, a same type or toy, same age group, etc. The digital promotion 57 may be redeemable toward purchase of a complimentary product to the high-demand product 22*a*, for example, a product that is used with the high-demand product (e.g., refills, accessories, etc.). The digital promotion 57 may be redeemable outside the marketplace 55, for example, at a given retailer that may have stock of the high-demand product 22*a* either online or in-store based upon the historical product data 23 and/or the current product data 24. Operations end at Block 98.

A method aspect is directed to a method of processing a high-demand product. The method includes using a high-demand product marketplace server 40 to store historical product data 23 for a given product 22*a*, wherein the historical product data includes historical product prices and historical product quantities at different historical times. The method also includes using the high-demand product marketplace server 40 to operate a web crawler 44 to crawl a plurality of e-commerce websites 36*a*-36*n* for current product data 24 for the given product 22*a*, wherein the current product data includes current product prices and current product quantities at each of the plurality of e-commerce websites. The method further includes using the high-demand product marketplace server 40 to operate a machine learning algorithm 45 to predict whether the given product 22*a* will be a high-demand product based upon the historical product data 23 and the current product data 24. The method further includes using the high-demand product marketplace server 40 to, when the given product 22*a* is predicted to be in high-demand, generate an offer-to-purchase 47 the high-demand product, communicate the offer-to-purchase to a seller device 30 associated with a prospective seller and operate a marketplace 55 to sell the high-demand product at a sales price 56 higher than an offer price 48 associated with the offer-to-purchase.

A computer readable medium aspect is directed to a non-transitory computer readable medium for processing a high-demand product. The non-transitory computer readable medium includes computer executable instructions that when executed by a processor 41 cause the processor to perform operations. The operations include storing historical product data 23 for a given product 22*a*. The historical product data 23 includes historical product prices and historical product quantities at different historical times. The operations also include operating a web crawler 44 to crawl a plurality of e-commerce websites 36*a*-36*n* for current product data 24 for the given product 22*a*. The current product data 24 includes current product prices and current product quantities at each of the plurality of e-commerce websites 36*a*-36*n*. The operations further include operating a machine learning algorithm 45 to predict whether the given product will be a high-demand product based upon the historical product data 23 and the current product data 24, and when so generating an offer-to-purchase 47 the high-demand product 22*a*, communicating the offer-to-purchase to the seller device, and operating a marketplace 55 to sell the high-demand product at a sales price 56 higher than an offer price 48 associated with the offer-to-purchase.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A high-demand product processing system comprising:
  a seller device associated with a prospective seller and comprising a display; and
  a high-demand product marketplace server configured to
    store historical product data for a given product, the historical product data comprising historical product prices and historical product quantities at different historical times, the stored historical product data being updated based upon purchases of the given product at point-of-sale (POS) devices at different retailers,
    operate a web crawler to crawl a plurality of e-commerce websites for current product data for the given product, the current product data comprising current product prices and current product quantities at each of the plurality of e-commerce websites, and
    operate a machine learning algorithm to predict whether the given product will be a high-demand product by accepting, as input to the machine learning algorithm, the historical product data and the current product data from web crawler, and generating as output therefrom, the prediction of whether the given product will be a high-demand product based upon at least one of changes in pricing and time of year, the machine learning algorithm being updated on an ongoing basis as the historical product data is updated, and as the current product data is collected through successive operations of the web crawler, and when the given product is predicted to be a high-demand product
      generate an offer-to-purchase the high-demand product at a current offer price,
      operate a price setting machine learning algorithm to determine a sales price associated with the high-demand product and higher than the current offer price based upon the current product data from the web crawler and the historical product data,
      operate the price setting machine learning algorithm to determine a threshold offer price lower than the determined sales price and higher than the current offer price,
      communicate the offer-to-purchase to the seller device for display on the display,
      cooperate with the seller device to prompt the prospective seller to provide input to accept or decline the offer-to-purchase at the current offer price,
      upon a decline of the offer-to-purchase at the current offer price by prospective seller and when the current purchase price is less than the threshold offer price
        increase the current offer price,
        communicate the offer-to-purchase with the increased current offer price to the seller device for display on the display, and
        cooperate with the seller device to prompt the prospective seller to provide input to accept or decline the offer-to-purchase at the increased current offer price,
      operate a marketplace to sell the high-demand product at the sales price associated with the offer-to-purchase and based upon the price setting machine learning algorithm,
      determine traffic on the marketplace, and update the price setting machine learning algorithm and the sales price of the high-demand product on the marketplace based upon the traffic on the marketplace, the historical product data, and the current product data from the web crawler.

2. The high-demand product processing system of claim 1 wherein the high-demand product marketplace server is configured to generate a digital promotion associated with the high-demand product.

3. The high-demand product processing system of claim 1 wherein the high-demand product marketplace server is configured to obtain a purchase price of the high-demand product made by the prospective seller, and generate the offer-to-purchase to be higher than the purchase price.

4. The high-demand product processing system of claim 1 wherein the high-demand product marketplace server is configured to determine the prospective seller based upon a product purchase history associated with the prospective seller.

5. The high-demand product processing system of claim 1 wherein the high-demand product marketplace server is configured to predict whether the given product will be a high-demand product based upon a threshold number of the high-demand products being sold in a given time period.

6. The high-demand product processing system of claim 1 wherein the high-demand product marketplace server is configured to predict whether the given product will be a high-demand product based upon the current product prices rising above a threshold price.

7. The high-demand product processing system of claim 1 wherein the high-demand product marketplace server is configured to predict whether the given product will be a high-demand product based upon the current product quantities falling below a threshold quantity.

8. A high-demand product marketplace server comprising:
a processor and an associated memory configured to
store historical product data for a given product, the historical product data comprising historical product prices and historical product quantities at different historical times, the stored historical product data being updated based upon purchases of the given product at point-of-sale (POS) devices at different retailers,
a web crawler to crawl a plurality of e-commerce websites for current product data for the given product, the current product data comprising current product prices and current product quantities at each of the plurality of e-commerce websites, and
operate a machine learning algorithm to predict whether the given product will be a high-demand product by accepting, as input to the machine learning algorithm, the historical product data and the current product data from the web crawler, and generating as output therefrom, the prediction of whether the given product will be a high-demand product based upon at least one of changes in pricing and time of year, the machine learning algorithm being updated on an ongoing basis as the historical product data is updated, and as the current product data is collected through successive operations of the web crawler, and when the given product is predicted to be a high-demand product
generate an offer-to-purchase the high-demand product including a current offer price,
operate a price setting machine learning algorithm to determine a sales price associated with the high-demand product and higher than the current offer price based upon the current product data from the web crawler and the historical product data,
operate the price setting machine learning algorithm to determine a threshold offer price lower than the determined sales price and higher than the current sales price,
communicate the offer-to-purchase to a seller device associated with a prospective seller and for display on a display of the seller device,
cooperate with the seller device to prompt the prospective seller to provide input to accept or decline the offer-to-purchase at the current offer price,
upon a decline of the offer-to-purchase at the current offer price by prospective seller and when the current purchase price is less than the threshold offer price
increase the current offer price,
communicate the offer-to-purchase with the increased current offer price to the seller device for display on the display, and
cooperate with the seller device to prompt the prospective seller to provide input to accept or decline the offer-to-purchase at the increased current offer price,
operate a marketplace to sell the high-demand product at the sales price associated with the offer-to-purchase and based upon the price setting machine learning algorithm,
determine traffic on the marketplace, and
update the price setting machine learning algorithm and the sales price of the high-demand product on the marketplace based upon the traffic on the marketplace, the historical product data, and the current product data from the web crawler.

9. The high-demand product marketplace server of claim 8 wherein the processor is configured to generate a digital promotion associated with the high-demand product.

10. The high-demand product marketplace server of claim 8 wherein the processor is configured to obtain a purchase price of the high-demand product made by the prospective seller, and generate the offer-to-purchase to be higher than the purchase price.

11. The high-demand product marketplace server of claim 8 wherein the processor is configured to predict whether the given product will be a high-demand product also based upon at least one of a threshold number of the high-demand products being sold in a given time period, the current product prices rising above a threshold price, and the current product quantities falling below a threshold quantity.

12. A method of processing a high-demand product comprising:
using a high-demand product marketplace server to
store historical product data for a given product, the historical product data comprising historical product prices and historical product quantities at different historical times, the stored historical product data being updated based upon purchases of the given product at point-of-sale (POS) devices at different retailers,
operate a web crawler to crawl a plurality of e-commerce websites for current product data for the given product, the current product data comprising current product prices and current product quantities at each of the plurality of e-commerce websites, and
operate a machine learning algorithm to predict whether the given product will be a high-demand product by accepting, as input to the machine learning algorithm, the historical product data and the current product data, and generating as output therefrom, the prediction of whether the given product will be a high-demand product based upon at least one of changes in pricing and time of year, the machine learning algorithm being updated as the historical product data is updated, and as the current product data is collected through successive operations of the web crawler, and when the given product is predicted to be a high-demand product generate an offer-to-purchase the high-demand product including a current offer price, operate a price setting machine learning algorithm to determine a sales price associated with the high-demand product and higher than the current offer price based upon the current product data from the web crawler and the historical product data, operate the price setting machine learning algorithm to determine a threshold offer price lower than the determined sales price and higher than the current offer price, communicate the offer-to-purchase to a seller device associated with a prospective seller and for display on a display of the seller device, cooperate with the seller device to prompt the prospective seller to provide input to accept or decline the offer-to-purchase at the current offer price, upon a decline of the offer-to-purchase at the current offer price by prospective seller and when the current purchase price is less than the threshold offer price increase the current offer price, communicate the offer-to-purchase with the increased current offer price to the seller device for display on the display, and cooperate with the seller device to prompt the prospective seller to provide input to accept or decline the offer-to-purchase at the increased current offer price, operate a marketplace to sell the high-demand product at the sales price associated with the offer-to-purchase and based upon the price setting machine learning algorithm, determine traffic on the marketplace, and update the price setting machine learning algorithm and the sales price of the high-demand product on the marketplace based upon the traffic on the marketplace, the historical product data, and the current product data from the web crawler.

13. The method of claim 12 wherein using the high-demand product marketplace server comprises using the high-demand product marketplace server to generate a digital promotion associated with the high-demand product.

14. The method of claim 12 wherein using the high-demand product marketplace server comprises using the high-demand product processing server to obtain a purchase price of the high-demand product made by the prospective seller, and generate the offer-to-purchase to be higher than the purchase price.

15. The method of claim 12 wherein using the high-demand product marketplace server comprises using the high-demand product processing server to predict whether the given product will be a high-demand product also based upon at least one of a threshold number of the high-demand products being sold in a given time period, the current product prices rising above a threshold price, and the current product quantities falling below a threshold quantity.

16. A non-transitory computer readable medium for processing a high-demand product, the non-transitory computer readable medium comprising computer executable einstructions that when executed by a processor cause the processor to perform operations comprising:

storing historical product data for a given product, the historical product data comprising historical product prices and historical product quantities at different historical times, the stored historical product data being updated based upon purchases of the given product at point-of-sale (POS) devices at different retailers;

operating a web crawler to crawl a plurality of e-commerce websites for current product data for the given product, the current product data comprising current product prices and current product quantities at each of the plurality of e-commerce websites; and operating a machine learning algorithm to predict whether the given product will be a high-demand product by accepting, as input to the machine learning algorithm, the historical product data and the current product data, and generating as output therefrom, the prediction of whether the given product will be a high-demand product based upon at least one of changes in pricing and time of year, the machine learning algorithm being updated as the historical product data is updated, and as the current product data is collected through successive operations of the web crawler, and when the given product is predicted to be a high-demand product generating an offer-to-purchase the high-demand product at a current offer price, operating a price setting machine learning algorithm to determine a sales price associated with the high-demand product and higher than the current offer price based upon the current product data from the web crawler and the historical product data, operating the price setting machine learning algorithm to determine a threshold offer price lower than the determined sales price and higher than the current offer price, communicating the offer-to-purchase to the seller device and for display on a display of the seller device, cooperating with the seller device to prompt the prospective seller to provide input to accept or decline the offer-to-purchase at the current offer price, upon a decline of the offer-to-purchase at the current offer price by prospective seller and when the current purchase price is less than the threshold offer price increasing the current offer price, communicating the offer-to-purchase with the increased current offer price to the seller device for display on the display, and cooperating with the seller device to prompt the prospective seller to provide input to accept or decline the offer-to-purchase at the increased current offer price, operating a marketplace to sell the high-demand product at the sales price associated with the offer-to-purchase and based upon the price setting machine learning algorithm, determining traffic on the marketplace, and updating the price setting machine learning algorithm and the sales price of the high-demand product on the marketplace based upon the traffic on the marketplace, the historical product data, and the current product data from the web crawler.

17. The non-transitory computer readable medium of claim 16 wherein the operations comprise generating a digital promotion associated with the high-demand product.

18. The non-transitory computer readable medium of claim 16 wherein the operations comprise obtaining a purchase price of the high-demand product made by the prospective seller, and generate the offer-to-purchase to be higher than the purchase price.

19. The non-transitory computer readable medium of claim 16 wherein the operations comprise predicting whether the given product will be a high-demand product also based upon at least one of a threshold number of the high-demand products being sold in a given time period, the current product prices rising above a threshold price, and the current product quantities falling below a threshold quantity.

\* \* \* \* \*

UNITED STATES PATENT AND TRADEMARK OFFICE
CERTIFICATE OF CORRECTION

PATENT NO. : 12,423,720 B1
APPLICATION NO. : 17/726938
DATED : September 23, 2025
INVENTOR(S) : Seth Maxwell et al.

Page 1 of 1

It is certified that error appears in the above-identified patent and that said Letters Patent is hereby corrected as shown below:

In the Claims

Column 9, Line 44, please insert -- operate -- before "a web crawler to crawl a plurality of e-commerce".

Signed and Sealed this
Twenty-third Day of December, 2025

John A. Squires
*Director of the United States Patent and Trademark Office*